United States Patent
Yang et al.

(10) Patent No.: US 11,120,493 B2
(45) Date of Patent: Sep. 14, 2021

(54) PAYMENT METHOD, APPARATUS AND SYSTEM

(71) Applicant: TENCENT TECHNOLOGY (SHENZHEN) COMPANY LIMITED, Shenzhen (CN)

(72) Inventors: Lang Yang, Shenzhen (CN); Xiongwei Xu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 460 days.

(21) Appl. No.: 15/794,206

(22) Filed: Oct. 26, 2017

(65) Prior Publication Data

US 2018/0047089 A1 Feb. 15, 2018

Related U.S. Application Data

(63) Continuation of application No. PCT/CN2016/096018, filed on Aug. 19, 2016.

(30) Foreign Application Priority Data

Sep. 24, 2015 (CN) .......................... 201510617815.9

(51) Int. Cl.
*G06Q 30/00* (2012.01)
*G06Q 30/06* (2012.01)
(Continued)

(52) U.S. Cl.
CPC ......... *G06Q 30/0635* (2013.01); *G06Q 20/38* (2013.01); *G06Q 20/40* (2013.01);
(Continued)

(58) Field of Classification Search
CPC ...................................................... G06Q 30/00
See application file for complete search history.

(56) References Cited

U.S. PATENT DOCUMENTS

| | | | | |
|---|---|---|---|---|
| 9,830,632 | B2 * | 11/2017 | Lenahan | ............ G06Q 30/0625 |
| 2002/0060246 | A1 * | 5/2002 | Gobburu | .............. G06Q 20/327 |
| | | | | 235/462.46 |

(Continued)

FOREIGN PATENT DOCUMENTS

| | | |
|---|---|---|
| CN | 101576989 A | 11/2009 |
| CN | 102761580 A | 10/2012 |

(Continued)

OTHER PUBLICATIONS

Stein, Scott, Samsung's LoopPay: what it is, and why you shpold care, cnet.com, dated Feb. 19, 2015. (Year: 2015).*

(Continued)

*Primary Examiner* — Mark A Fadok
(74) *Attorney, Agent, or Firm* — Anova Law Group, PLLC

(57) ABSTRACT

A payment method includes obtaining, by a platform application running on a terminal, order information from a web page corresponding to a merchant, sending the order information to a backend server by using the web page, obtaining a preparatory order number from the web page, and calling a payment application running on the terminal to complete a payment procedure with the backend server according to the preparatory order number. The merchant accesses the platform application through the web page. The preparatory order number is generated by the backend server according to the order information and is sent to the web page.

14 Claims, 8 Drawing Sheets

(51) Int. Cl.
*G06Q 20/38* (2012.01)
*G06Q 20/40* (2012.01)
*H04W 12/06* (2021.01)
*G06F 3/14* (2006.01)

(52) U.S. Cl.
CPC ......... *G06Q 30/06* (2013.01); *G06Q 30/0641* (2013.01); *H04W 12/06* (2013.01); *G06F 3/14* (2013.01)

(56) References Cited

U.S. PATENT DOCUMENTS

| | | | | |
|---|---|---|---|---|
| 2002/0156696 | A1* | 10/2002 | Teicher | G06Q 20/04 705/16 |
| 2008/0222046 | A1* | 9/2008 | McIsaac | G06Q 20/12 705/64 |
| 2009/0327114 | A1* | 12/2009 | Sheth | G06Q 20/02 705/35 |
| 2012/0036042 | A1 | 2/2012 | Graylin et al. | |
| 2012/0072311 | A1* | 3/2012 | Khan | G06Q 30/0635 705/26.81 |
| 2012/0323735 | A1* | 12/2012 | Montero | G06Q 20/385 705/26.41 |
| 2013/0325721 | A1 | 12/2013 | Ghong et al. | |
| 2014/0100991 | A1* | 4/2014 | Lenahan | G06Q 30/0643 705/26.62 |
| 2014/0108248 | A1* | 4/2014 | Portillo | G06Q 20/04 705/44 |
| 2014/0195386 | A1 | 7/2014 | Wang et al. | |
| 2014/0229339 | A1 | 8/2014 | Massiere et al. | |
| 2014/0246490 | A1* | 9/2014 | Graylin | G06Q 20/3272 235/379 |
| 2014/0249948 | A1* | 9/2014 | Graylin | G06Q 20/385 705/21 |
| 2015/0081534 | A1* | 3/2015 | Zamer | G06Q 20/08 705/40 |
| 2015/0170149 | A1* | 6/2015 | Sharma | G06Q 20/027 705/44 |
| 2016/0071095 | A1* | 3/2016 | Foerster | G06Q 20/20 705/65 |
| 2016/0232520 | A9* | 8/2016 | Singhal | G06Q 20/02 |
| 2016/0321650 | A1* | 11/2016 | Fedak | G06Q 20/12 |

FOREIGN PATENT DOCUMENTS

| | | |
|---|---|---|
| CN | 102999838 A | 3/2013 |
| CN | 104820928 A | 8/2015 |
| JP | H11353382 A | 12/1999 |
| JP | 2008129635 A | 6/2008 |
| JP | 2012523608 A | 10/2012 |
| JP | 2012529699 A | 11/2012 |
| JP | 2015521332 A | 7/2015 |
| KR | 20070107965 A | 11/2007 |
| KR | 20110124930 A | 11/2011 |
| KR | 101167501 B1 | 7/2012 |
| WO | 2010013296 A1 | 2/2010 |

OTHER PUBLICATIONS

Stiel, Haley, "10 ways to pay with your smartphone", fueled.com, dated Aug. 8, 2017. (Year: 2017).*
The Japan Patent Office (JPO) Notification of Reasons for Refusal for Application No. 2017-563261 dated Feb. 26, 2019 14 Pages (including translation).
Korean Intellectual Property Office (KIPO) Notification of Reasons for Refusal for 10-2017-7034993 dated Aug. 14, 2018 15 Pages (including translation).
The European Patent Office (EPO) the Extended European Search Report for 16847951.7 dated Apr. 5, 2018 9 Pages.
The Japan Patent Office (JPO) Notification of Reasons for Refusal for Application No. 2017-563261 and Translation dated Jul. 23, 2019 15 Pages.
The World Intellectual Property Organization (WIPO) International Search Report for PCT/CN2016/096018 dated Nov. 25, 2016 5 Pages (including translation).

* cited by examiner

PAYMENT METHOD, APPARATUS AND SYSTEM

CROSS-REFERENCE TO RELATED APPLICATIONS

The application is a continuation application of International Application No. PCT/CN2016/096018, filed on Aug. 19, 2016, which claims priority to China Patent Application No. 201510617815.9, filed with the Chinese Patent Office on Sep. 24, 2015 and entitled "PAYMENT METHOD, APPARATUS AND SYSTEM," the entire contents of both of which are incorporated herein by reference.

FIELD OF THE TECHNOLOGY

Embodiments of the present disclosure relate to the field of computer and Internet technologies, and in particular, to a payment method, apparatus and system.

BACKGROUND OF THE DISCLOSURE

With the rising of online shopping, various online shopping platforms appear. These online shopping platforms undoubtedly provide a reliable guarantee for orderly and standardized online shopping.

By downloading and installing a shopping platform application provided by an online shopping platform in a terminal, a user can perform a series of purchasing procedures, such as merchant selection, goods ordering, and online payment. Currently, a shopping platform application is accessed by a merchant in the following two ways: one is to access a shopping platform application in a form of an open interface; the other is to access a shopping platform application in a form of a web page. In the case in which the merchant accesses a shopping platform application in the form of the web page, an existing online payment procedure is as follows: After a user finishes goods ordering, the shopping platform application calls a web payment tool. The user enters a user account and a corresponding login password in a login page provided by the web payment tool. After logging on to the web payment tool, the user enters a payment password to complete the payment procedure.

SUMMARY

In accordance with the disclosure, there is provided a payment method including obtaining, by a platform application running on a terminal, order information from a web page corresponding to a merchant, sending the order information to a backend server by using the web page, obtaining a preparatory order number from the web page, and calling a payment application running on the terminal to complete a payment procedure with the backend server according to the preparatory order number. The merchant accesses the platform application through the web page. The preparatory order number is generated by the backend server according to the order information and is sent to the web page.

Also in accordance with the disclosure, there is provided a payment method including receiving, by a backend server, order information from a web page corresponding to a merchant. The merchant accessing a platform application through the web page. The method further includes generating a preparatory order number according to the order information and sending the preparatory order number to the web page for the web page to provide the preparatory order number to the platform application. The platform application calls a payment application to complete a payment procedure with the backend server according to the preparatory order number. The platform application and the payment application being run on a same terminal.

Also in accordance with the disclosure, there is provided a terminal including a processor and a memory coupled to the processor. The memory stores instructions that, when executed by the processor, cause the processor to obtain order information from a web page corresponding to a merchant. The merchant accessing a platform application running on the terminal through the web page. The instructions further cause the processor to send the order information to a backend server by using the web page, obtain a preparatory order number from the web page that is generated by the backend server according to the order information and sent to the web page, and call a payment application running on the terminal to complete a payment procedure with the backend server according to the preparatory order number.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes the embodiments of the present disclosure in detail with reference to the accompanying drawings.

Figure 1A:
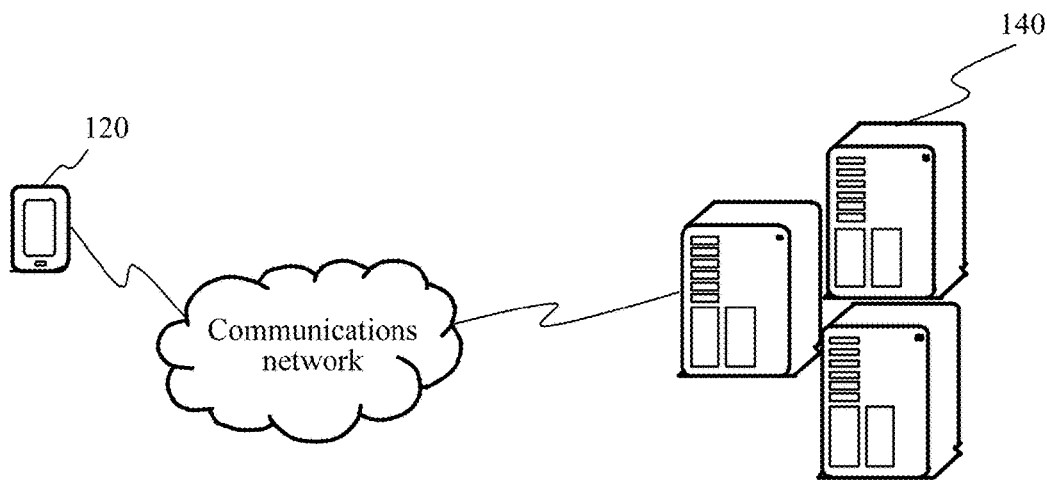
FIG. 1A is a schematic structural diagram of an implementation environment according to an embodiment of the present disclosure.

FIG. 1 shows a schematic structural diagram of a implementation environment according to an embodiment of the present disclosure. The implementation environment includes a terminal 120 and a backend server 140.

The terminal 120 may be electronic devices, such as a smartphone, a panel computer, an e-book reader, a multimedia playback device, a laptop, or the like.

In the embodiments of the present disclosure, the terminal 120 runs a platform application and a payment application. Herein, the platform application refers to an application (APP) of a platform level that provides an accessing function for a merchant so that the merchant can provide various services for users. In the embodiments of the present disclosure, types of services provided for the platform application are not limited, including, but not limited to shopping services, daily life services, car services, and the like. A merchant refers to an institution or an individual that accesses the platform application and provides services for users in the platform application. For example, the foregoing institution may be a businessman, a manufacturer, an agent, or a dealer. In the embodiments of the present disclosure, the merchant accesses the platform application in a form of a web page. That is, in the platform application, to display the merchant and the services provided in the form of the web page. Users can check and purchase required services in the web page corresponding to the merchant. For example, the web page corresponding to the merchant may be a web page developed by using hypertext markup language 5 (HTML5).

In one example, the platform application is a shopping platform application, and the shopping platform application refers to the APP of the platform level that provides an online buying and selling interface for users and merchants. For example, the shopping platform application may be Jingdong mall APP provided by China Beijing Jingdong Century Trading Company Limited, Tmall APP provided by China Alibaba Company, or Taobao APP provided by China Alibaba Company. In this example, the merchant refers to an institution or an individual that accesses the shopping platform application and sells goods to users in the shopping platform application. The merchant may be a manufacturer, an agent or a dealer of goods. In this example, the merchant accesses the shopping platform application in the form of the web page. That is, in the shopping platform application, the merchant and the goods to be sold are displayed in the form of the web page. Users can check and purchase goods in the web page corresponding to the merchant.

In another example, the platform application is a platform application of daily life services, and the platform application of daily life services refers to an APP of a platform level that provides an accessing function for a merchant so that the merchant can provide various daily life services for users. For example, the foregoing daily life services include but are not limited to a takeaway service, a housekeeping service, a tutoring service, an art training service, an air ticket/ticket/hotel booking service, a service of acting as an agent, a real estate rental service, and the like. For example, the platform application of daily life services may be 58 city APP provided by China Beijing 58 Information Technology Company Limited, Ganji APP provided by China Shanjing Branch Network Technology (Beijing) Company Limited, or Tuniu travel APP provided by China Nanjing Tuniu Technology Company Limited. In this example, the merchant refers to an institution or an individual that accesses the platform application of daily life services and provides daily life services to users of the platform application of daily life services. The merchant may be a provider, an agent or a dealer of services. In this example, the merchant accesses the shopping platform application of daily life services in the form of the web page. That is, in the platform application of daily life services, the merchant and the daily life services provided are displayed in the form of the web page. Users can check and purchase services on the web page corresponding to the merchant.

The payment application refers to a client APP used for implementing an online payment function. For example, the payment application may be Wechat Payment provided by China Tencent Company, or Alipay provided by China Alibaba Company. Compared with web payment, the client APP with payment function is safer because the client application has a built-in security check module and a transferring process is not easily hijacked.

A communication connection is established between the terminal 120 and the backend server 140 by using a communications network, which may be a wired network or a wireless network.

The backend server 140 may be one server, or a server cluster formed by a plurality of servers, or a cloud computing center.

Figure 1B:
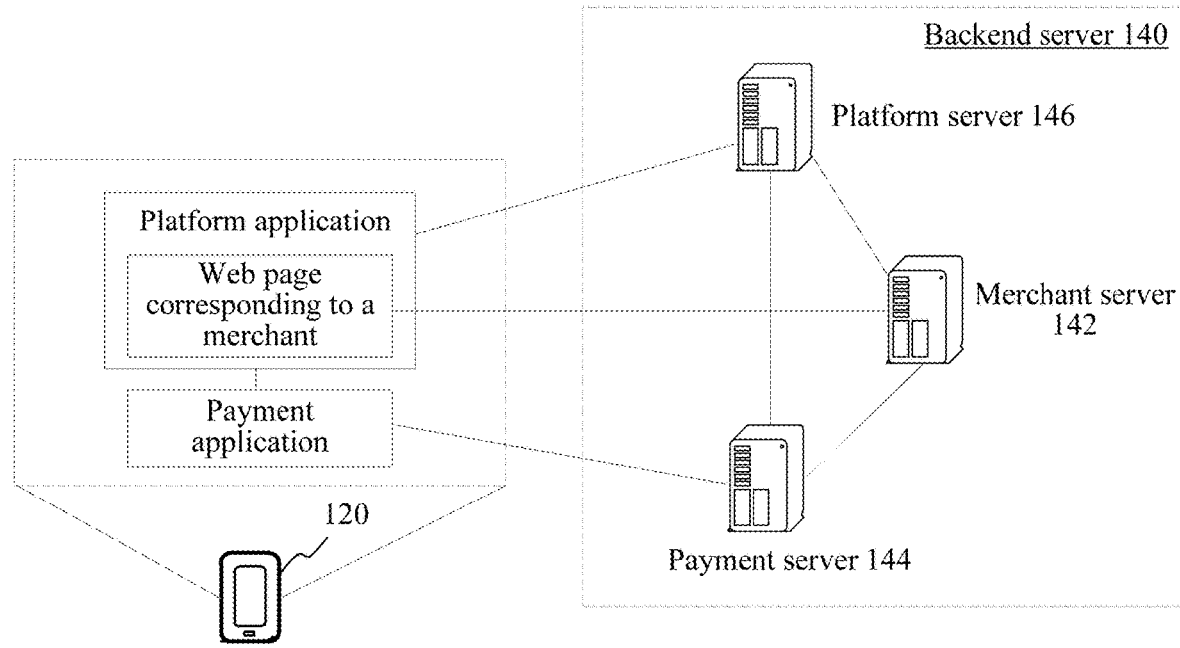
FIG. 1B is a schematic structural diagram of a backend server according to an embodiment of the present disclosure.

In some embodiments, as shown in FIG. 1B, the backend server 140 has a cluster architecture. The backend server 140 includes a merchant server 142 corresponding to the merchant and a payment server 144 corresponding to the payment application. Here, the merchant server 142 is a backend server of the merchant. A Hyper Text Transfer Protocol (HTTP) connection is established between the merchant server 142 and the web page corresponding to the merchant. They communicate with each other by using the HTTP connection. The payment server 144 is a backend server of the payment application. A communication connection is established between the payment server 144 and the payment application. In some embodiments, as shown in FIG. 1B, the backend server 140 further includes a platform server 146 corresponding to the platform application. The platform server 146 is a backend server of the platform application. A communication connection is established between the platform server 146 and the platform application.

Figure 2:
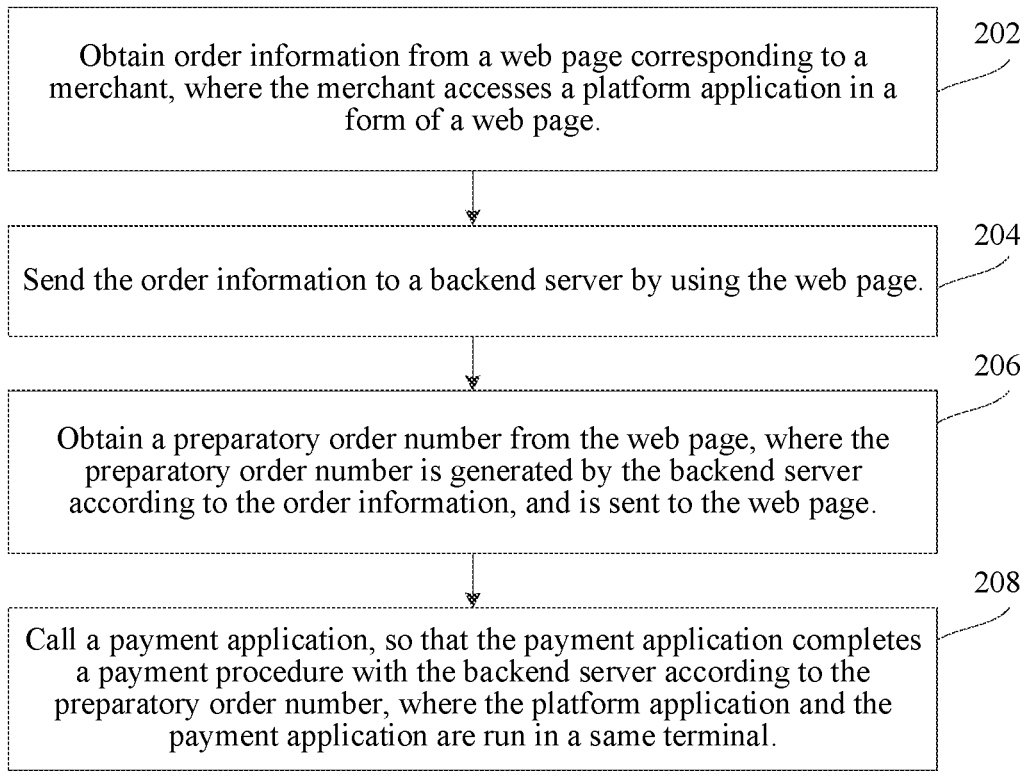
FIG. 2 is a method flowchart of a payment method according to an embodiment of the present disclosure.

FIG. 2 shows a method flowchart of a payment method according to an embodiment of the present disclosure. The payment method may be applied to the platform application running in the terminal 120 in the implementation environment shown in FIG. 1.

As shown in FIG. 2, at S202, order information is obtained from a web page corresponding to a merchant. The merchant accesses the platform application in a form of a web page, e.g., through the web page corresponding to the merchant.

At S204, the order information is sent to a backend server by using the web page.

At S206, a preparatory order number is obtained from the web page. The preparatory order number is generated by the backend server according to the order information and sent to the web page.

At S208, a payment application is called to complete a payment procedure with the backend server according to the preparatory order number. The platform application and the payment application are running in a same terminal.

In summary, the embodiment provides a payment method including obtaining a preparatory order number from a backend server through a web page corresponding to a merchant; obtaining, by a platform application, the preparatory order number from the web page corresponding to the merchant; and calling the payment application to complete a payment procedure with the backend server according to the preparatory order number. As such, a problem in the existing technology that operations of a related online payment procedure are relatively complex and of low security in the case that a merchant accesses the platform application in a form of a web page can be resolved. Because a payment application is directly called, a user can directly enter payment check information to complete a payment procedure. There is no need for the user to manually enter a user account and a login password to log on to a web payment tool, so that a technical effect of simplifying an operation procedure, increasing payment efficiency, and improving security is achieved.

Figure 3:
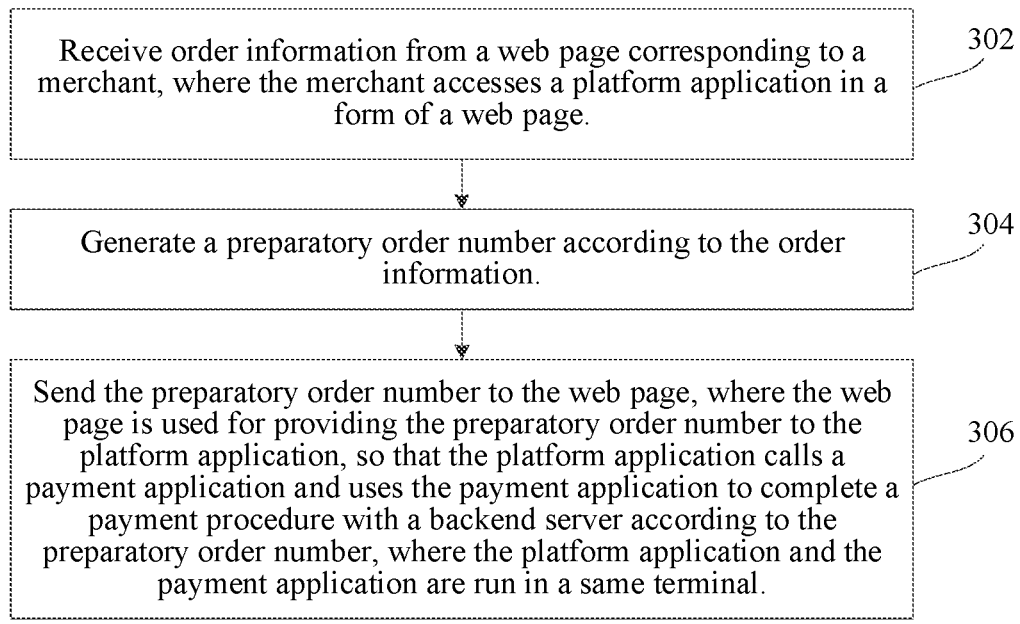
FIG. 3 is a method flowchart of a payment method according to another embodiment of the present disclosure.

FIG. 3 shows a method flowchart of a payment method according to another embodiment of the present disclosure. The payment method may be applied to the backend server 140 in the implementation environment shown in FIG. 1.

As shown in FIG. 3, at S302 order information is received from a web page corresponding to a merchant. The merchant accesses a platform application in a form of a web page, e.g., through the web page corresponding to the merchant.

At S304, a preparatory order number is generated according to the order information.

At S306, the preparatory order number is sent to the web page. The web page is used for providing the preparatory order number to the platform application, so that the platform application calls a payment application and uses the payment application to complete a payment procedure with the backend server according to the preparatory order number. The platform application and the payment application are running in a same terminal.

In summary, the embodiment provides a payment method including obtaining order information by a backend server from a web page corresponding to a merchant; generating a preparatory order number according to the order information and returning the preparatory order number to the web page corresponding to the merchant, so that the web page corresponding to the merchant provides the preparatory order number to a platform application so that the platform application can call a payment application to complete a payment procedure with the backend server according to the preparatory order number. As such, a problem in the existing technology that operations of a related online payment procedure are relatively complex and of low security in a case that a merchant accesses the platform application in a form of a web page can be resolved. Because the payment application is directly called, a user can directly enter payment check information to complete the payment procedure. There is no need for the user to manually enter a user account and a login password to log on to a web payment tool, so that a technical effect of simplifying an operation procedure, increasing payment efficiency, and improving security is achieved.

Figure 4:
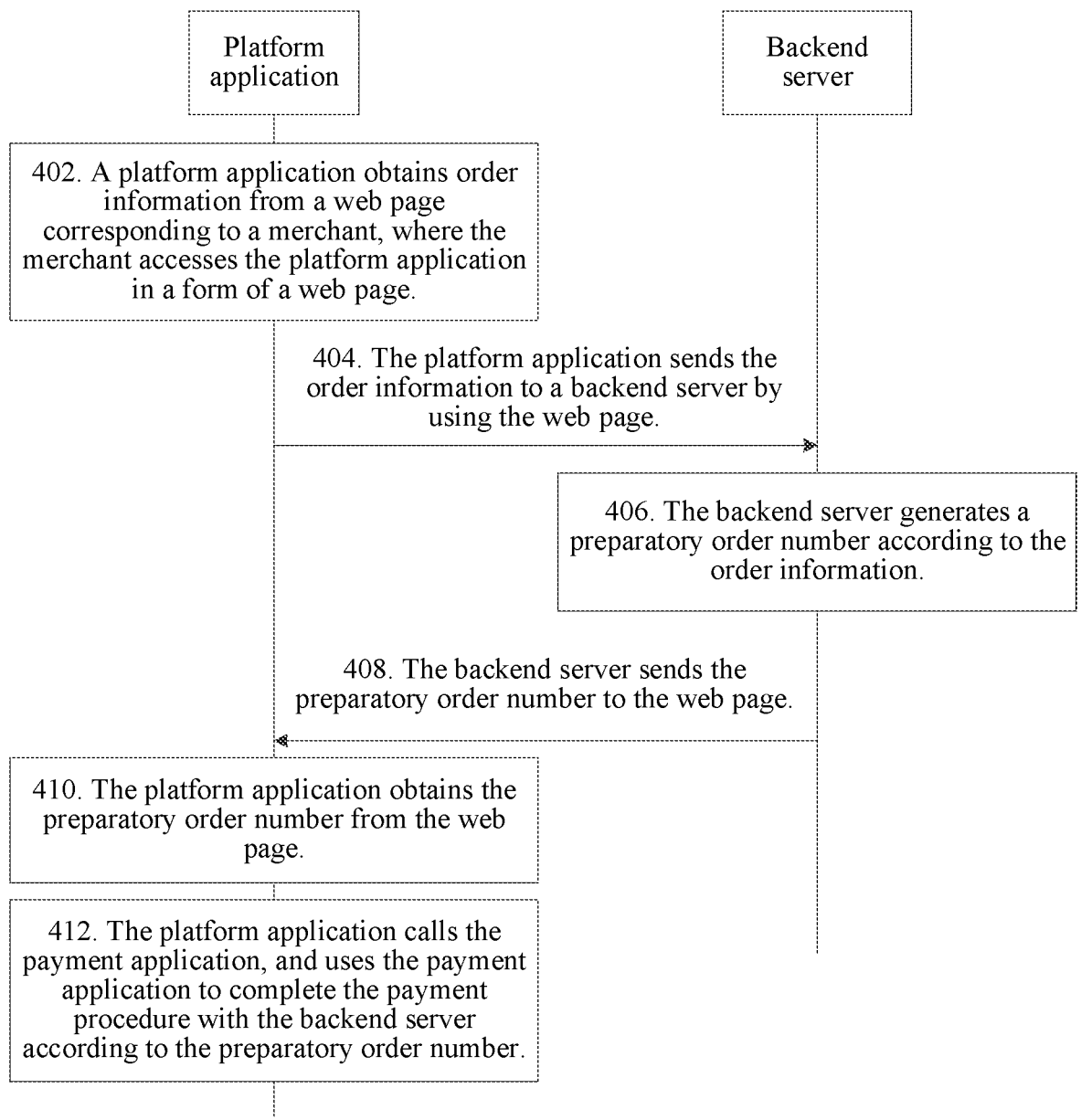
FIG. 4 is a method flowchart of a payment method according to still another embodiment of the present disclosure.

FIG. 4 shows a method flowchart of a payment method according to still another embodiment of the present disclosure. The payment method may be applied to the implementation environment shown in FIG. 1.

As shown in FIG. 4, at S402, a platform application obtains order information from a web page corresponding to a merchant, where the merchant accesses the platform application in a form of a web page, e.g., through the web page corresponding to the merchant.

At S404, the platform application sends the order information to a backend server by using the web page.

Correspondingly, the backend server receives the order information from the web page.

At S406, the backend server generates a preparatory order number according to the order information.

At S408, the backend server sends the preparatory order number to the web page.

Correspondingly, the web page receives the preparatory order number sent by the backend server.

At S410, the platform application obtains the preparatory order number from the web page.

At S412, the platform application calls a payment application to complete a payment procedure with the backend server according to the preparatory order number.

In summary, the embodiment provides a payment method including obtaining a preparatory order number from a backend server through a web page corresponding to a merchant; obtaining, by a platform application, the preparatory order number from the web page corresponding to the merchant; and calling a payment application to complete a payment procedure with the backend server according to the preparatory order number. As such, a problem in the existing technology that operations of a related online payment procedure are relatively complex and of low security in a case that a merchant accesses the platform application in a form of a web page can be resolved. Because the payment application is directly called, a user can directly enter payment check information to complete the payment procedure. There is no need for the user to manually enter a user account and a login password to log on to a web payment tool, so that a technical effect of simplifying an operation procedure, increasing payment efficiency, and improving security is achieved.

Figure 5A:
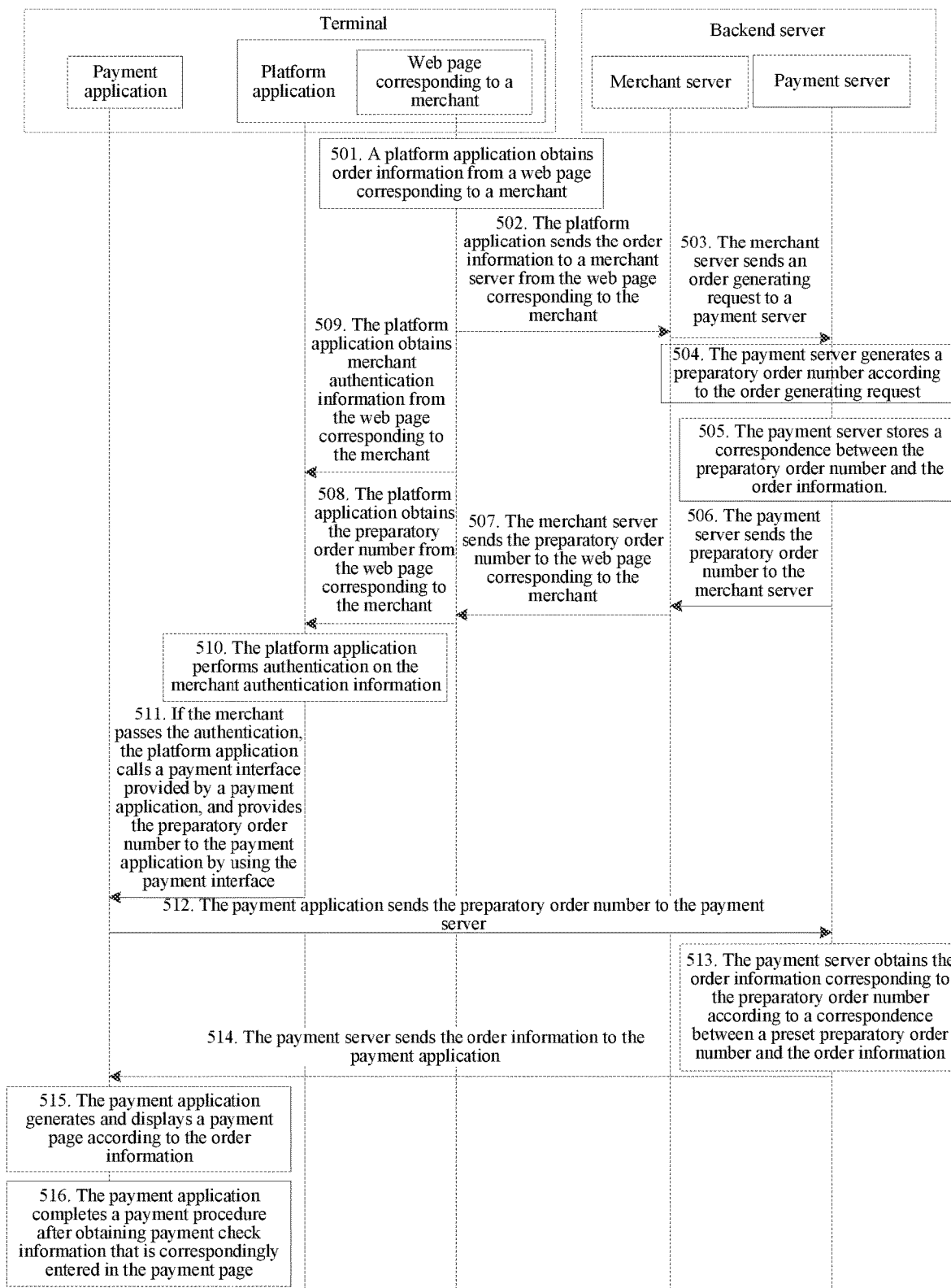
FIG. 5A is a method flowchart of a payment method according to yet another embodiment of the present disclosure.

FIG. 5A shows a method flowchart of a payment method according to yet another embodiment of the present disclosure. In this embodiment, descriptions are provided by using an example in which the payment method is applied to the implementation environment shown in FIG. 1.

As shown in FIG. 5A, at S501, a platform application obtains order information from a web page corresponding to a merchant.

Here, the merchant accesses the platform application in the form of the web page. The web page corresponding to the merchant is used for displaying related information about goods that the merchant sells, for example, names, types, prices, introductions, preview images, or comments of the goods. A user can check, select and purchase goods on the web page corresponding to the merchant. Correspondingly, the web page corresponding to the merchant obtains the order information. The order information is used for indicating the goods ordered by the user and a total price to be paid. For example, the order information may include names, quantities, and prices of the goods.

In this embodiment of the present disclosure, the types of goods that the merchant sells are not limited. The goods that the merchant sells may be physical goods such as foods, customs, home appliances, furniture, or books, or may be virtual goods such as game currencies, telephone fare, or membership, or services such as housekeeping, tutoring, or acting as an agent.

At S502, the platform application sends the order information to a merchant server from the web page corresponding to the merchant.

An HTTP connection is established between the web page corresponding to the merchant and the merchant server corresponding to the web page corresponding to the merchant. The web page corresponding to the merchant sends the order information to the merchant server by using the HTTP connection.

Correspondingly, the merchant server receives the order information from the web page corresponding to the merchant.

At S503, the merchant server sends an order generating request to a payment server.

Here, the order generating request includes at least the order information. The order generating request is used for requesting the payment server to establish a preparatory order and generate a corresponding preparatory order number.

In some embodiments, the order generating request further includes a merchant identifier corresponding to the merchant. Here, the merchant identifier is used for uniquely identifying the merchant. Different merchants correspond to different merchant identifiers.

Correspondingly, the payment server receives the order generating request sent by the merchant server.

At S504, the payment server generates the preparatory order number according to the order generating request.

Here, the preparatory order number is used for uniquely identifying the preparatory order. Different preparatory orders correspond to different preparatory order numbers. The payment server may generate the preparatory order number according to a preset rule. For example, the payment server generates the preparatory order number according to a current time and the merchant identifier corresponding to the merchant.

In some embodiments, in a case that the order generating request includes the merchant identifier, the payment server detects, according to the merchant identifier, whether the merchant is a registered merchant. The payment server generates the preparatory order number if detecting that the merchant is a registered merchant. On the other hand, if the payment server detects that the merchant is not a registered merchant, the payment server returns a response that is used for indicating an order generating failure to the merchant server.

In one possible implementation, a procedure for the payment server to detect, according to the merchant identifier, whether the merchant is a registered merchant includes the payment server detecting whether a registered merchant identifier cluster includes the merchant identifier corresponding to the merchant; if yes, confirming that the merchant is a registered merchant; and if no, confirming that the merchant is not a registered merchant. Here, the registered merchant identifier cluster includes merchant identifiers respectively corresponding to merchants that have successfully registered with the payment server.

At S505, the payment server stores a correspondence between the preparatory order number and the order information.

At S506, the payment server sends the preparatory order number to the merchant server.

Correspondingly, the merchant server receives the preparatory order number sent by the payment server.

In some embodiments, the payment server may store the correspondence before, after, or at the same time of sending the preparatory order number. In this embodiment, the scenario that the payment server sends the preparatory order number after storing the correspondence as an example, but the present disclosure is not limited to this example.

At S507, the merchant server sends the preparatory order number to the web page corresponding to the merchant.

After obtaining the preparatory order number returned by the payment server, the merchant server sends the preparatory order number to the web page corresponding to the merchant by using the HTTP connection established between the web page corresponding to the merchant and the merchant server.

Correspondingly, the web page corresponding to the merchant receives the preparatory order number sent by the merchant server.

At S508, the platform application obtains the preparatory order number from the web page corresponding to the merchant.

After receiving the preparatory order number, the web page corresponding to the merchant provides the preparatory order number to the platform application.

In one possible implementation, the platform application provides a predetermined interface to the web page corresponding to the merchant. The predetermined interface may be a Java Script interface. The platform application obtains the preparatory order number from the web page corresponding to the merchant by using the predetermined interface. In some embodiments, after obtaining the preparatory order number, the web page corresponding to the merchant calls the predetermined interface and provides the preparatory order number to the platform application by using the predetermined interface.

At S509, the platform application obtains merchant authentication information from the web page corresponding to the merchant.

In some embodiments, the merchant authentication information includes the merchant identifier corresponding to the merchant and/or the order information. The merchant authentication information is used for the platform application to check legality of the merchant. In some embodiments, the platform application obtains the merchant authentication information from the web page corresponding to the merchant by using the predetermined interface.

The web page corresponding to the merchant may provide the preparatory order number and the merchant authentication information to the platform application together, or in sequence. That is, the platform application can obtain the preparatory order number from the web page corresponding to the merchant before, after, or at the same time of obtaining the merchant authentication information from the web page corresponding to the merchant. In some embodiments, the web page corresponding to the merchant provides the preparatory order number and the merchant authentication information to the platform application together.

At S510, the platform application performs authentication on the merchant authentication information.

The platform application checks whether the merchant is legitimate according to the merchant authentication information. In a case that the merchant authentication information includes the merchant identifier corresponding to the merchant, the platform application detects, according to the merchant identifier, whether the merchant is a registered merchant. The check procedure is similar to the procedure of authenticating the merchant by the payment server discussed above, and thus detailed description thereof is omitted.

In a case that the merchant authentication information includes the order information, the platform application detects whether the goods and prices are legitimate according to the order information. As described above, the order information can be used for indicating the goods ordered by the user and a total price to be paid. For example, the order information may include names, quantities, and prices of the goods. The platform application detects, with reference to names of goods and corresponding prices that are previously provided by the merchant, whether the goods and prices are falsified. If determining that the goods and prices are falsified, the platform application confirms that the goods and prices are not legitimate.

In addition, the platform application may locally check the legality of the merchant, or check the legality of the merchant on a cloud. In a case that the legality of the merchant is checked on the cloud, the platform application sends the merchant authentication information to the platform server corresponding to the platform application. The platform server detects whether the merchant is legitimate according to the merchant authentication information and returns an authentication result to the platform application.

At S511, if the merchant passes the authentication, the platform application calls a payment interface provided by the payment application, and provides the preparatory order number to the payment application by using the payment interface.

Here, the payment application refers to a client APP used for implementing an online payment function, but not a web payment tool. The payment application and the platform application are running in a same terminal. The payment application provides the payment interface to the platform application to call.

In some embodiments, the platform application provides a registered identifier to the payment application.

On the other hand, if the merchant does not pass the authentication, the procedure ends and the deal fails. The platform application may further return a response indicating that the merchant does not pass the legality check to the merchant server so that the merchant knows a reason why the deal fails.

After receiving the preparatory order number, the payment application completes the payment procedure with the payment server according to the preparatory order number, as described in more detail below.

At S512: The payment application sends the preparatory order number to the payment server.

Correspondingly, the payment server receives the preparatory order number sent by the payment application.

In some embodiments, the payment application sends both the registered identifier of the platform application and the preparatory order number to the payment server.

At S513, the payment server obtains the order information corresponding to the preparatory order number according to a correspondence between preset preparatory order numbers and order information.

At S514: The payment server sends the order information to the payment application.

Correspondingly, the payment application receives the order information sent by the payment server.

In some embodiments, the payment server checks, according to the registered identifier of the platform application, whether the platform application is successfully registered, and sends the order information to the payment application if the platform application is successfully registered.

At S515, the payment application generates and displays a payment page according to the order information.

In some embodiments, the payment page includes at least an amount of payment and an operation control the user to enter the payment check information. In some embodiments, the payment page further includes information such as a payee and the order information.

At S516, the payment application completes the payment procedure after obtaining the payment check information that is correspondingly entered in the payment page.

In some embodiments, the payment application checks whether the payment check information is correct after obtaining the payment check information that is correspondingly entered in the payment page, and performs a collection procedure in a case in which the payment check information is correct. Here, the payment check information refers to check information that is used for confirming payment and is preset in the payment application. In the embodiments of the present disclosure, a form of implementing the payment check information is not limited, including, but is not limited to, a digital password, a graphical password, a fingerprint, a voiceprint, a human face, or the like.

In some embodiments, after completing the payment procedure, the payment server sends a payment completing indication to the merchant server for notifying the merchant that the user has successfully paid. The payment completing indication includes the preparatory order number. Correspondingly, the merchant may arrange a procedure, such as shipping a package according to the preparatory order number. In addition, the payment server may regularly transfer received money to the merchant.

Figure 5B:
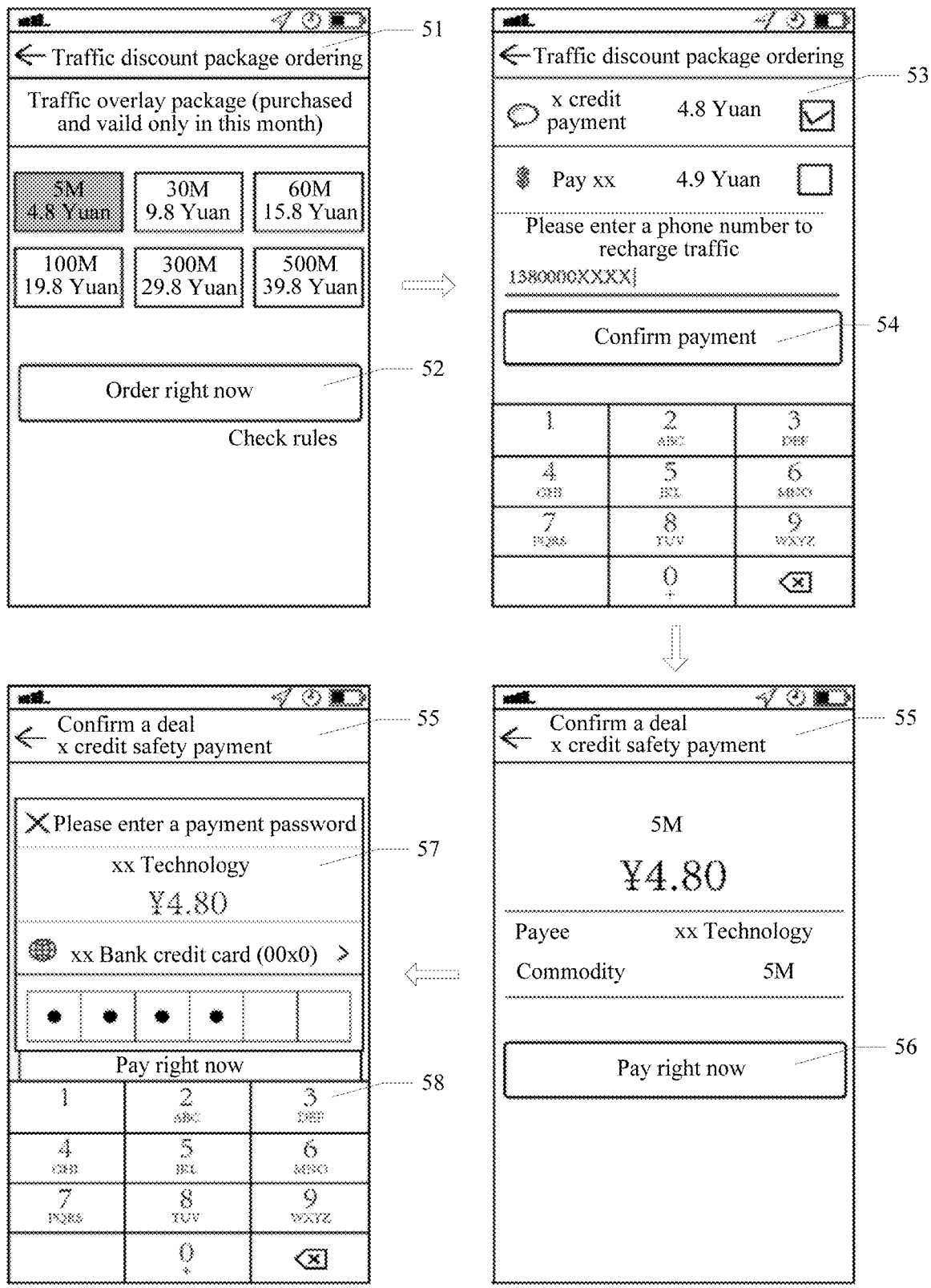
FIG. 5B is a schematic diagram of a user interface according to an embodiment shown in FIG. 5A.

FIG. 5B schematically shows how the merchant accesses the platform application in the form of the web page according to an exemplary embodiment. The user selects goods that he/she wishes to buy on a web page 51 provided by the merchant and clicks a "Order right now" button 52 after finishing the selection. The platform application displays a payment method selection page 53. The user selects a payment application named "X credit payment" in the payment method selection page 53 and clicks a "Confirm payment" button 54. Thereafter, the platform application calls the payment application named "X credit payment," which displays a payment page 55. After the user clicks a "Pay right now" button 56 in the payment page 55, the payment application displays a floating window 57 and an input keyboard 58 for the user to enter the payment check information. The user completes the payment after entering the payment check information (for example, a six-digit password).

In summary, the embodiment provides a payment method including obtaining a preparatory order number from a backend server through a web page corresponding to a merchant; obtaining, by a platform application, the preparatory order number from the web page corresponding to the merchant; and calling a payment application to complete a payment procedure with the backend server according to the preparatory order number. As such, a problem in the existing technology that operations of a related online payment procedure are relatively complex and of low security in a case that a merchant accesses the platform application in a form of a web page can be resolved. Because the payment application is directly called, a user can directly enter payment check information to complete a payment procedure. There is no need for the user to manually enter a user account and a login password to log on to a web payment tool, so that a technical effect of simplifying an operation procedure, increasing payment efficiency, and improving security is achieved.

In addition, the payment method provided by the embodiment checks whether the merchant is registered by using the payment server, checks the legality of the merchant by using the platform application, and checks whether the platform application is registered by using the payment application. As such, payment security can be guaranteed.

Further, the embodiments of the present disclosure provide a payment solution in which the platform application needs only to provide a page display interface to the merchant and does not need to participate in the procedure such as generating the preparatory order, making collections and shipping goods, therefore greatly reducing a cost of developing and maintaining the platform application.

Figure 6A:
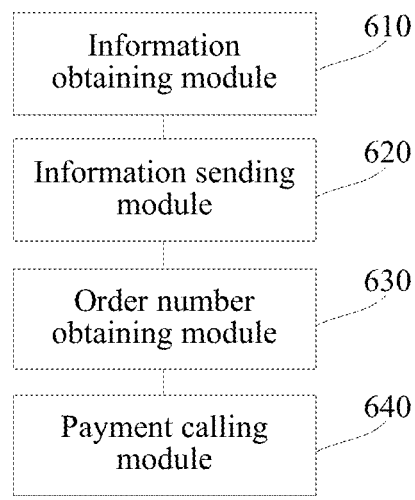
FIG. 6A is a structural block diagram of a payment apparatus according to an embodiment of the present disclosure.

FIG. 6A shows a structural block diagram of a payment apparatus according to an embodiment of the present disclosure. The payment apparatus has a function of implementing the foregoing method of a terminal. The function may be implemented by using hardware, or corresponding software that are performed by using the hardware. As shown in FIG. 6A, the payment apparatus includes an information obtaining module 610, an information sending module 620, an order number obtaining module 630, and a payment calling module 640.

The information obtaining module 610 is configured to obtain order information from a web page corresponding to a merchant, where the merchant accesses a platform application in a form of a web page, e.g., through the web page corresponding to the merchant.

The information sending module 620 is configured to send the order information to a backend server by using the web page.

The order number obtaining module 630 is configured to obtain a preparatory order number from the web page, where the preparatory order number is generated by the backend server according to the order information and sent to the web page.

The payment calling module 640 is configured to call a payment application to complete a payment procedure with the backend server according to the preparatory order number. In some embodiments, the platform application and the payment application are run in a same terminal.

In summary, by means of the payment apparatus provided in the embodiment, a preparatory order number is obtained from a backend server from a web page corresponding to a merchant; and a platform application obtains a preparatory order number from the web page corresponding to the merchant, and calls the payment application to complete a payment procedure with the backend server according to the preparatory order number. As such, a problem in the existing technology that operations of a related online payment procedure are relatively complex and of low security in a case that a merchant accesses the platform application in a form of a web page can be resolved. Because a payment application is directly called, a user can directly enter payment check information to complete a payment procedure. There is no need for the user to manually enter a user account and a login password to log on to a web payment tool, so that a technical effect of simplifying an operation procedure, increasing payment efficiency, and improving security is achieved.

In some embodiments, the payment calling module 640 is configured to call a payment interface provided by the payment application, and provide the preparatory order number to the payment application by using the payment interface. The payment application is used for obtaining the order information from the backend server according to the preparatory order number; generating and displaying a payment page according to the order information; and completing the payment procedure after obtaining payment check information that is correspondingly entered in the payment page.

Figure 6B:
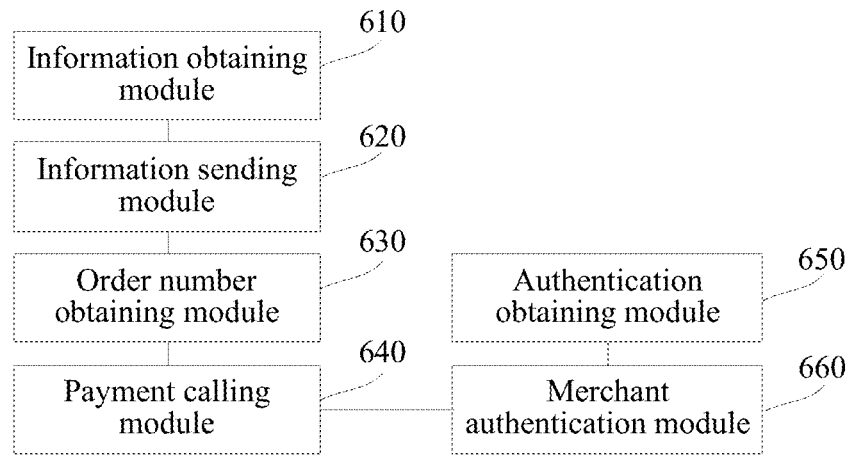
FIG. 6B is a structural block diagram of a payment apparatus according to another embodiment of the present disclosure.

FIG. 6B shows a structural block diagram of a payment apparatus according to another embodiment of the present disclosure. The apparatus shown in FIG. 6B is similar to the apparatus shown in FIG. 6A, except that the apparatus shown in FIG. 6B further includes an authentication obtaining module 650 and a merchant authentication module 660.

The authentication obtaining module 650 is configured to obtain merchant authentication information from the web page, where the merchant authentication information includes a merchant identifier corresponding to the merchant and/or the order information.

The merchant authentication module 660 is configured to perform authentication on the merchant authentication information.

The payment calling module 640 is further configured to call the payment application to complete a payment procedure with the backend server according to the preparatory order number if the authentication is passed.

In some embodiments, the backend server cluster includes a merchant server corresponding to the merchant and a payment server corresponding to the payment application.

The information sending module 620 shown in FIGS. 6A and 6B is further configured to send the order information to the merchant server by using the web page. The merchant server sends an order generating request to the payment server, where the order generating request includes at least the order information. The payment server is configured to generate the preparatory order number according to the order generating request, and send the preparatory order number to the merchant server.

Figure 7:
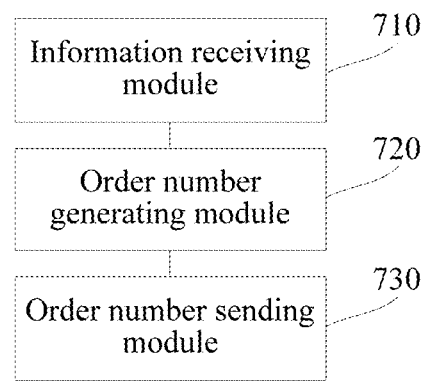
FIG. 7 is a structural block diagram of a payment apparatus according to another embodiment of the present disclosure.

FIG. 7 shows a structural block diagram of a payment apparatus according to another embodiment of the present disclosure. The payment apparatus has a function of implementing the foregoing method of the foregoing backend server. The function may be implemented by using hardware, or corresponding software that are performed by using the hardware. As shown in FIG. 7, the payment apparatus includes an information receiving module 710, an order number generating module 720, and an order number sending module 730.

The information receiving module 710 is configured to receive order information from a web page corresponding to a merchant, where the merchant accesses a platform application in a form of a web page, e.g., through the web page corresponding to the merchant.

The order number generating module 720 is configured to generate a preparatory order number according to the order information.

The order number sending module 730 is configured to send the preparatory order number to the web page. The web page is used for providing the preparatory order number to the platform application. The platform application calls a payment application to complete a payment procedure with the backend server according to the preparatory order number. The platform application and the payment application are running in a same terminal.

In summary, by means of the payment apparatus provided in the embodiment, order information is obtained by a backend server from a web page corresponding to a merchant, a preparatory order number is generated according to the order information, and the preparatory order number is returned to the web page corresponding to the merchant. The web page corresponding to the merchant provides the preparatory order number to a platform application; and the platform application calls a payment application to complete a payment procedure with the backend server according to the preparatory order number. As such, a problem in the existing technology that operations of a related online payment procedure are relatively complex and of low security in a case that a merchant accesses the platform application in a form of a web page can be resolved. Because a payment application is directly called, a user can directly enter payment check information to complete a payment procedure. There is no need for the user to manually enter a user account and a login password to log on to a web payment tool, so that a technical effect of simplifying an operation procedure, increasing payment efficiency, and improving security is achieved.

In some embodiments, the order number generating module 720 is further configured to send an order generating request to the payment server after receiving the order information from the web page by using the merchant server corresponding to the merchant; and generate the preparatory order number according to the order generating request corresponding to the payment application and store a correspondence between the preparatory order number and the order information by using the payment server; and send the preparatory order number to the merchant server, and send the preparatory order number to the web page by using the merchant server. The order generating request includes at least the order information In some embodiments, the order generating request further includes a merchant identifier corresponding to the merchant. In these embodiments, generating the preparatory order number according to the order generating request by using the payment server corresponding to the payment application includes detecting, by the payment server and according to the merchant identifier, whether the merchant is a registered merchant; and generating the preparatory order number by using the payment server if the merchant is a registered merchant.

Figure 8:
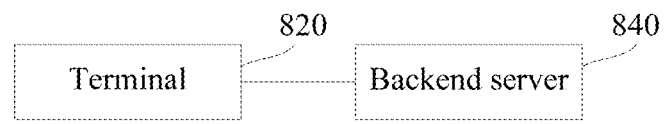
FIG. 8 is a structural block diagram of a payment system according to an embodiment of the present disclosure.

FIG. 8 shows a structural block diagram of a payment system according to an embodiment of the present disclosure. The payment system includes a terminal 820 and a backend server 840, where the terminal 820 runs a platform application and a payment application.

The terminal 820 includes a payment apparatus consistent with the disclosure, such as one of the exemplary payment apparatuses described above in connection with FIG. 6A and FIG. 6B.

The backend server 840 includes a payment apparatus consistent with the disclosure, such as one of the exemplary payment apparatuses described above in connection with FIG. 7.

Figure 9A:
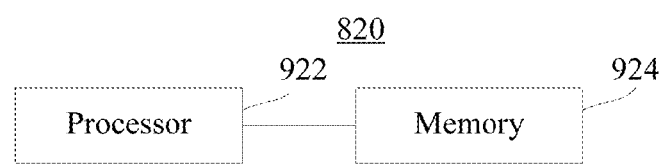
FIG. 9A is a structural block diagram of a terminal according to an embodiment of the present disclosure.

FIG. 9A a structural block diagram of the terminal 820 according to an embodiment of the present disclosure. As shown in FIG. 9A, the terminal 820 includes a processor 922 and a memory 924 coupled to the processor 922. The processor 922 can be, for example, a central processing unit (CPU), a field-programmable gate array (FPGA), or an application-specific integrated circuit (ASIC). The memory 924 includes a non-transitory computer-readable storage medium storing instructions that, when executed by the processor 922, cause the processor 922 to perform a method consistent with the disclosure, such as one of the above-described exemplary payment methods for implementing in a terminal. The memory 924 can be, for example, a read-only memory (ROM), a random access memory (RAM), a CD-ROM, a magnetic tape, a floppy disk, or an optical data storage device.

Figure 9B:
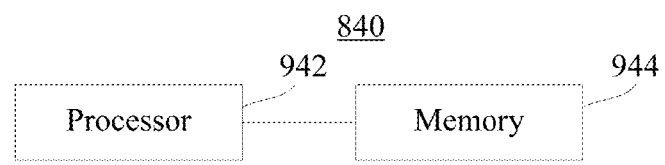
FIG. 9B is a structural block diagram of a backend server according to an embodiment of the present disclosure.

FIG. 9B a structural block diagram of the backend server 840 according to an embodiment of the present disclosure. As shown in FIG. 9B, the backend server 840 includes a processor 942 and a memory 944 coupled to the processor 942. The processor 942 can be, for example, a central processing unit (CPU), a field-programmable gate array (FPGA), or an application-specific integrated circuit (ASIC). The memory 944 includes a non-transitory computer-readable storage medium storing instructions that, when executed by the processor 942, cause the processor 942 to perform a method consistent with the disclosure, such as one of the above-described exemplary payment methods for implementing in a backend server. The memory 944 can be, for example, a read-only memory (ROM), a random access memory (RAM), a CD-ROM, a magnetic tape, a floppy disk, or an optical data storage device.

It should be noted that, the foregoing embodiment provides the payment apparatus and system. The foregoing division of the functional modules is merely an example for description. In practical application, the foregoing functions may be allocated to and completed by different functional modules as required, that is, an inner structure of a device is divided into different functional modules, so as to complete all or some of the functions described above.

In an exemplary embodiment, a non-transitory computer readable storage medium that includes instructions is further provided, for example, a memory that includes instructions. The instructions may be performed by a processor of a terminal to complete part or all of a method consistent with the disclosure, or be performed by a processor of a server to complete part or all of a method consistent with the disclosure. For example, the non-transitory computer readable storage medium may be an ROM, a random access memory (RAM), a CD-ROM, a magnetic tape, a floppy disk, or an optical data storage device.

It should be noted that, "multiple" mentioned in this specification means two or more than two. The "and/or" in this specification describes an association relationship for describing associated objects and represents that three relationships may exist. For example, A and/or B may represent the following three cases: Only A exists, both A and B exist, and only B exists. The character "/" generally indicates an "or" relationship between the associated objects. The sequence numbers of the embodiments of the present disclosure are merely for the convenience of description, and do not imply the preference among the embodiments.

A person of ordinary skill in the art may understand that part or all of a method consistent with the disclosure may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely exemplary embodiments of the present disclosure, but are not intended to limit the present disclosure. Any modification, equivalent replacement, or improvement made within the spirit and principle of the present disclosure shall fall within the scope of the present disclosure.

What is claimed is:
1. A payment method, comprising:
   obtaining, by a platform application running on a terminal, order information from a platform web page corresponding to a merchant, the platform application providing an online buying and selling interface for users and merchants for goods and services;
   sending, by the platform application, the order information to a merchant server corresponding to the merchant, wherein the merchant server receives the order information by accessing the platform web page corresponding to the merchant; sends, based on the received order information, an order generating request to a payment server; receives a preparatory order number returned by the payment server; and provides the preparatory order number to the platform web page through a predetermined interface;

obtaining, by the platform application, the preparatory order number from the platform web page after the merchant server provides the preparatory order number to the platform web page;

before the platform application initiating a payment procedure, performing, by a platform server corresponding to the platform application, an authentication on merchant authentication information obtained from the platform web page maintained by the merchant server, the merchant authentication information including a merchant identifier corresponding to the merchant and the order information, wherein different merchants correspond to different merchant identifiers; and in response to the platform server determining that the merchant passes the authentication, calling, by the platform application, a payment application running on the same terminal to complete the payment procedure with the payment server according to the preparatory order number, wherein the platform server, the merchant server, and the payment server are separate servers; and performing the authentication on the merchant authentication information comprises: determining, by the platform server, with reference to names of goods and corresponding prices previously provided by the merchant, whether goods and prices in the order information are falsified.

2. The method according to claim 1, wherein calling the payment application to complete the payment procedure with the payment server according to the preparatory order number includes:

calling a payment interface provided by the payment application; and providing, by the platform application, the preparatory order number to the payment application by using the payment interface.

3. The method according to claim 2, further comprising:

obtaining, by the payment application, the order information from the payment server according to the preparatory order number;

generating and displaying, by the payment application, a payment page according to the order information; and completing the payment procedure after obtaining payment check information entered in the payment page.

4. The method according to claim 1, wherein the predetermined interface called by the merchant server to provide the preparatory order number to the platform web page is a Java Script interface.

5. The method according to claim 1, wherein the merchant authentication information is provided by the merchant server to the platform web page together with the preparatory order number.

6. The method according to claim 1, wherein the platform web page is maintained and updated through a web page display interface provided by the platform application to the merchant server.

7. The method according to claim 1, wherein performing the authentication on the merchant authentication information comprises:

determining, by the platform server, whether the merchant is a registered merchant according to the merchant identifier.

8. The method according to claim 1, wherein performing the authentication on the merchant authentication information further comprises:

detecting, by the platform server, whether the merchant is a registered merchant according to the merchant identifier.

9. A payment method, comprising:

receiving, by a merchant server, order information from a platform web page corresponding to a merchant, wherein the order information is obtained by a platform application running on a terminal, and the merchant server corresponds to the merchant and obtains the order information by accessing the platform web page;

sending, by the merchant server, an order generating request to a payment server, the order generating request includes at least the order information;

receiving, by the merchant server, a preparatory order number according to the order information returned by the payment server; and providing, by the merchant server, the preparatory order number to the platform web page through a predetermined interface, so that the platform application obtains the preparatory order number, obtains merchant authentication information from the platform web page, the merchant authentication information including a merchant identifier corresponding to the merchant;

before the platform application initiating a payment procedure, an authentication is performed by a platform server corresponding to the platform application on merchant authentication information obtained from the platform web page maintained by the merchant server;

in response to determining that the merchant passes the authentication, the platform application calls a payment application to complete the payment procedure with the payment server according to the preparatory order number, the platform application and the payment application being run on the same terminal, wherein the platform server, the merchant server, and the payment server are separate servers; and the merchant authentication information includes the order information, and the authentication performed by the platform server includes determining, with reference to names of goods and corresponding prices previously provided by the merchant, whether goods and prices in the order information are falsified.

10. The method according to claim 9, further comprising:

generating, by the payment server, the preparatory order number according to the order generating request and storing a correspondence between the preparatory order number and the order information; and sending, by the payment server, the preparatory order number to the merchant server.

11. The method according to claim 10, wherein:

the order generating request further includes the merchant identifier corresponding to the merchant; and generating, by the payment server, the preparatory order number according to the order generating request includes:

detecting, by the payment server, according to the merchant identifier, whether the merchant is a registered merchant; and generating, by the payment server, the preparatory order number if the merchant is the registered merchant.

12. A terminal comprising:

a processor; and a memory coupled to the processor and storing instructions that, when executed by the processor, cause the processor to:

obtain, by a platform application executed by the processor, order information from a platform web page corresponding to a merchant, the platform application providing an online buying and selling interface for users and merchants for goods and services;

send the order information to a merchant server corresponding to the merchant, wherein the merchant server receives the order information by accessing the platform web page corresponding to the merchant; sends, based on the received order information, an order generating request to a payment server; receives a preparatory order number returned by the payment server; and provides the preparatory order number to the platform web page through a predetermined interface;

obtain the preparatory order number from the platform web page after the merchant server provides the preparatory order number to the platform web page;

obtain merchant authentication information from the platform web page, the merchant authentication information including a merchant identifier corresponding to the merchant and the order information, wherein different merchants correspond to different merchant identifiers, and before the platform application initiating a payment procedure, an authentication is performed by a platform server corresponding to the platform application on merchant authentication information obtained from the platform web page maintained by the merchant server, and the authentication includes determining, with reference to names of goods and corresponding prices previously provided by the merchant, whether goods and prices in the order information are falsified; and in response to the platform server determining that the merchant passes the authentication, call a payment application running on the same terminal to complete the payment procedure with the payment server according to the preparatory order number.

13. The terminal according to claim 12, wherein the instructions further cause the processor to:

call a payment interface provided by the payment application; and provide the preparatory order number to the payment application by using the payment interface.

14. The terminal according to claim 13, wherein the instructions further cause the processor to:

obtain the order information from the payment server according to the preparatory order number;

generate and display, in the payment application, a payment page according to the order information; and complete the payment procedure after obtaining payment check information entered in the payment page.

\* \* \* \* \*